(12) United States Patent
Kriebernegg et al.

(10) Patent No.: US 8,910,766 B2
(45) Date of Patent: Dec. 16, 2014

(54) MULTI-DISC CLUTCH

(71) Applicant: MAGNA Powertrain AG & Co KG, Lannach (AT)

(72) Inventors: August Kriebernegg, Koflach (AT); Alois Lafer, Kainbach bei Graz (AT); Robert Luef, St Jakob im Walde (AT); Johannes Quenhenberger, Saalbach (AT); Helmuth Sachsenmaier, Graz (AT)

(73) Assignee: Magna Powertrain AG & Co AG, Lannach (AT)

( * ) Notice: Subject to any disclaimer, the term of this patent is extended or adjusted under 35 U.S.C. 154(b) by 0 days.

(21) Appl. No.: 13/917,827

(22) Filed: Jun. 14, 2013

(65) Prior Publication Data
US 2013/0334002 A1 Dec. 19, 2013

Related U.S. Application Data

(63) Continuation of application No. 12/786,567, filed on May 25, 2010, now abandoned.

(30) Foreign Application Priority Data

May 26, 2009 (DE) .......................... 10 2009 022 668

(51) Int. Cl.
*F16D 13/74* (2006.01)
*F16D 13/52* (2006.01)
*F16D 13/69* (2006.01)

(52) U.S. Cl.
CPC ............... *F16D 13/52* (2013.01); *F16D 13/69* (2013.01); *F16D 13/74* (2013.01); *F16D 2300/06* (2013.01)

USPC .................. 192/70.12; 192/93 A; 192/113.35

(58) Field of Classification Search
USPC ................. 192/70.12, 70.28, 113.34, 113.35, 192/85.39, 85.41, 48.611
See application file for complete search history.

(56) References Cited

U.S. PATENT DOCUMENTS

| 1,949,053 | A | * | 2/1934 | Kutter | 192/70.2 |
|---|---|---|---|---|---|
| 2,523,501 | A | * | 9/1950 | Davies et al. | 192/70.28 |
| 2,827,142 | A | * | 3/1958 | Aschauer | 192/70.12 |
| 2,976,975 | A | * | 3/1961 | Thostenson et al. | 192/70.12 |
| 5,495,927 | A | * | 3/1996 | Samie et al. | 192/70.12 |
| 5,570,767 | A | * | 11/1996 | Lauscher | 192/70.12 |
| 5,873,444 | A | * | 2/1999 | Kozhevnikov et al. | 192/18 A |
| 6,244,407 | B1 | * | 6/2001 | Kremer et al. | 192/70.12 |

* cited by examiner

*Primary Examiner* — Troy Chambers
*Assistant Examiner* — Ryan Dodd
(74) *Attorney, Agent, or Firm* — Dickinson Wright PLLC

(57) ABSTRACT

The present invention relates to a multi-disc clutch for the transfer of torque between a first clutch part and a second clutch part, having at least one first and at least one second disc that engage on another and that are movable parallel to a rotational axis of the multi-disc clutch, and having a reset device for the reciprocal ventilation of adjacent discs. The first clutch part is connected in a rotationally secure fashion to the first disc and the second clutch part is connected in a rotationally secure fashion to the second disc. The reset device has at least two reset elements that are disposed eccentrically relative to the rotational axis and distributed in the circumferential direction.

26 Claims, 7 Drawing Sheets

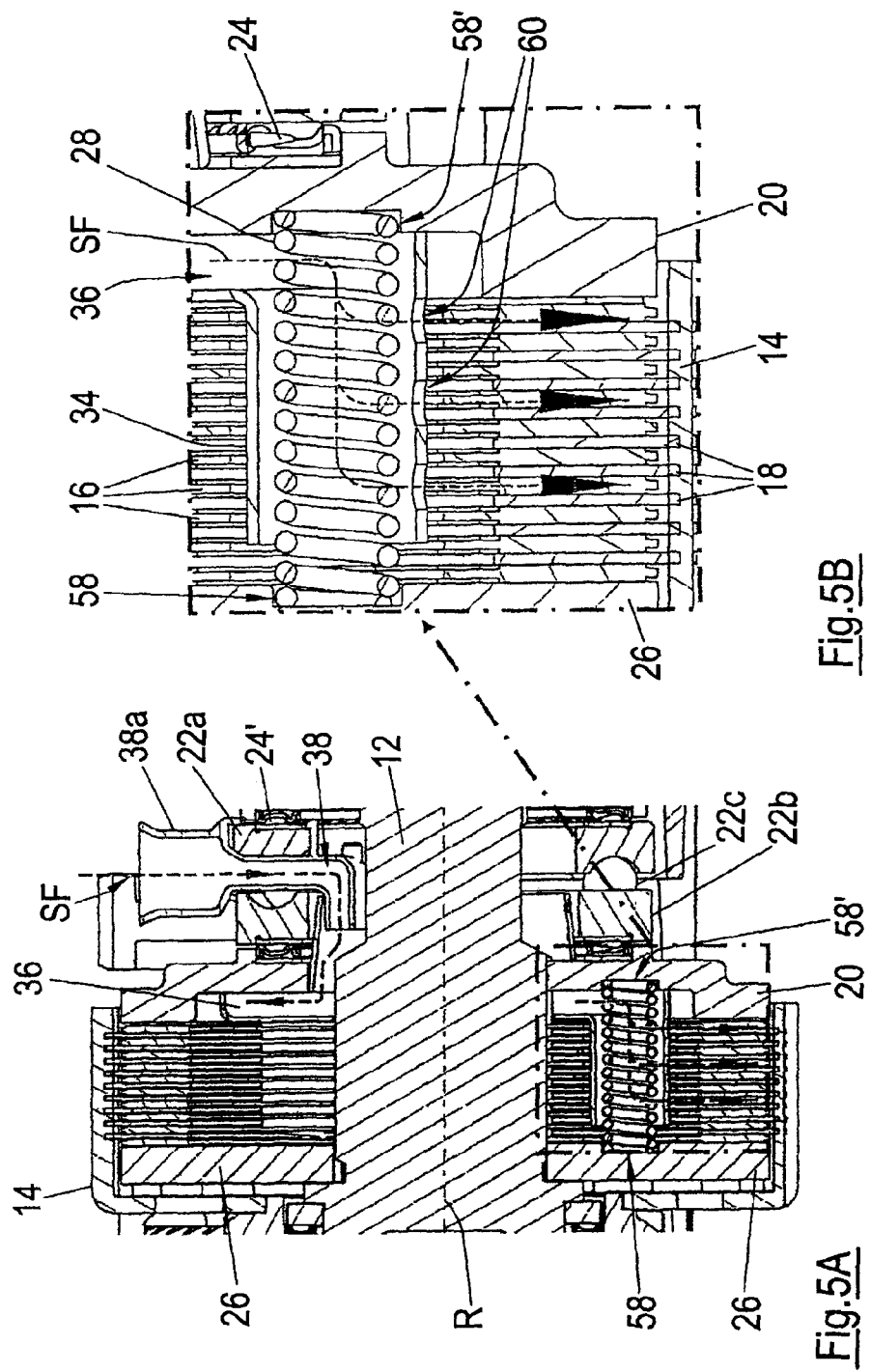

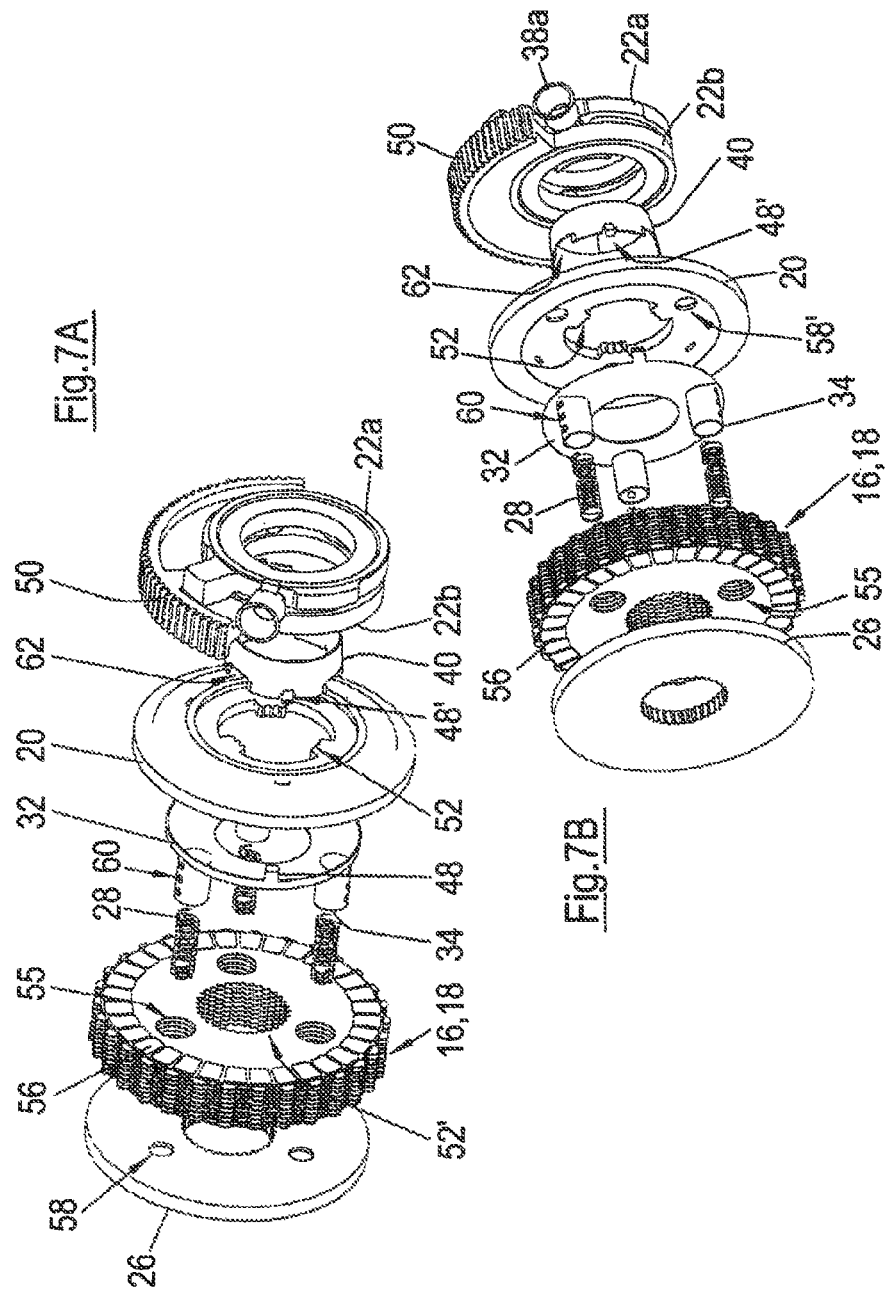

MULTI-DISC CLUTCH

CROSS REFERENCE TO RELATED APPLICATIONS

This application is a continuation of U.S. application Ser. No. 12/786,567 filed May 25, 2010 which claims priority to German Application No. 10 2009 022 668.0 filed May 26, 2009. The entire disclosure of each of the above-noted applications is incorporated herein by reference.

FIELD

The present invention relates to a multi-disc clutch for the transfer of torque between a first clutch part and a second clutch part.

BACKGROUND

Multi-disc clutches of this type see widespread use, especially in motor vehicles. For example, multi-disc clutches are used in transfer cases, which are used in all-wheel drive vehicles for distributing torque onto the individual vehicle axles. As a rule, multi-disc clutches have inner and outer discs engaging with one another that are connected to an inner part of the clutch (e.g., the input shaft) or an outer part (e.g., the clutch cage). In order to be able to connect the shaft and the clutch cage in a driven manner, the discs are placed in a frictional engagement with one another. Such a multi-disc clutch is disclosed in DE 10 2006 034, 153 A1. It includes a clutch hub that produces a rotationally secure connection between the inner discs of the clutch and the input shaft. A return device for the clutch is also disposed in the hub in order to be able to reliably separate the inner and outer discs from one another ("ventilation") and reduce drag torque when separating the clutch. Multi-disc clutches of this kind are generally wet running, i.e., the discs are lubricated and cooled using oil.

Although multi-disc clutches of this type are very reliable, clutches are needed that are more cost effective and that are not inferior in any way to the known clutches, in particular with regard to their dynamics and ability to transfer torque.

SUMMARY OF THE INVENTION

The object of the present invention is therefore to create a multi-disc clutch that is cost-effective to produce and that allows the transfer of high torques while at the same time having a high degree of dynamics.

The multi-disc clutch according to the invention for the transfer of torque between a first clutch part and a second clutch part, for example, a shaft and a clutch cage, has at least one first disc and at least one second disc, which engage in one another and are movable parallel to a rotational axis of the multi-disc clutch. Moreover, a reset device is provided for the reciprocal release of neighboring discs. The first clutch part is connected to the first disc (for example, an inner disc) in a rotationally secure fashion, and the second clutch part is connected to the second disc (for example, an outer disc) in a rotationally secure fashion. Any desired number of discs may be provided.

The multi-disc clutch is characterized in that the reset device has at least two reset elements that are eccentrically disposed relative to the rotational axis and distributed in the circumferential direction. In particular, the reset elements are evenly distributed in the circumferential direction. In certain applications, an uneven distribution of the reset elements—not only in the circumferential direction, but also in the radial direction—may also be advantageous.

Known multi-disc clutches have at least one reset device that is disposed coaxially to a shaft, i.e., surrounds the shaft in the circumferential direction. Such a reset device is, for example, a compression spring that coaxially surrounds the shaft. As already mentioned above in conjunction with the known multi-disc clutches, a clutch hub accommodates the reset device in such cases. This structural principle is not used according to the invention; rather, the reset device has a plurality of reset elements that are offset radially outward, i.e., are not disposed coaxially to the rotational axis. The reset elements are distributed in the circumferential direction in order to generate a reset force at various points, which allows a reliable ventilation of the discs. In particular, the reset elements lie on a common circle whose center point coincides with the rotational axis of the multi-disc clutch.

The spatial orientation of the reset elements in their eccentric position relative to the shaft—i.e., for example, whether they are disposed with their longitudinal extension parallel or slightly oblique to the shaft—may be adapted to the particular requirements in each case.

The construction according to the invention allows the hub, which has been used up to now, to be omitted or at least to have a substantially simpler structure. This reduces the production costs and allows for a more compact configuration.

The first disc preferably has at least one respective recess through which at least one of the reset elements extends in the axial direction. The reset elements thus extend partially through the stack of discs formed by the at least one first disc and at least one second disc.

The reset elements may be disposed radially inside the second disc relative to the rotational axis. In other words, the reset elements are disposed inside the inner diameter of the second disc in the radial direction. For example, a plurality of first and second discs are provided, with the first discs being inner discs and the second discs being outer discs. In this case, the inner circumference of the outer discs is disposed farther outward radially than the reset elements. In this arrangement, when the multi-disc clutch is activated, the connection between the first and the second discs is created radially outside of the reset elements in order to allow for the transfer of the greatest possible amount of torque.

The first clutch part may be a shaft or a coupling sleeve connected to a shaft in a rotationally secure manner, with the first disc/s extending in the radial direction essentially to the shaft. In other words, a coupling sleeve is to be understood as a simple component that particularly serves to simplify installation, but does not have any substantial radial extension in its own right. The first disc/s should therefore be connected in a rotationally secure fashion to the shaft, either directly or indirectly, via the sleeve mentioned above. In the case of an indirect connection, it is preferable for the inner circumference of the disc to essentially correspond to the outer circumference of the shaft, i.e., for the sleeve to be relatively thin and, in particular, not to house any additional structural or functional components. The rotationally secure connection may be formed using a spline, for example.

It is preferable for the shaft to be a through drive of a transfer case, with the shaft simultaneously forming an input shaft and a first output shaft, and with the transfer case having a second output shaft, as is described in DE 10 2006 034, 153 A1, which was mentioned at the outset. However, the transfer case may also be embodied as an interaxle differential transmission. In such a case, the shaft is not a through drive, but rather, for example, a driven shaft of the transfer case, and the multi-disc clutch serves as a locking clutch in this case.

According to one embodiment of the multi-disc clutch, a retaining device is provided for securing the reset elements in the radial direction of the multi-disc clutch. The retaining device thus counteracts the centrifugal forces that occur during operation of the clutch and secures the position of the reset elements in order to allow a reliable ventilation of the clutch in all operating states.

An advantageous development of the retaining device includes a pin extending in the axial direction for each reset element that carries the respective reset element. In particular, the pin is supported in the axial direction on a first component of the clutch and is disposed in an axially movable fashion relative to a second component of the clutch. The components mentioned above are disposed in a rotationally secure fashion relative to one another on sides of the disc stack that are axially opposite one another. The second component may be, for example, an axially movable pressure disc (pressure piston) for activating the clutch. The first component may be, for example, an axially fixed counterpressure disc against which the stack of discs is pressed when the clutch is activated. With regard to the axial support of the pin, it should be mentioned that the support may be direct or indirect, with an indirect support being understood as an interposition of one or more components.

According to an additional embodiment, a distributor insert having at least one conduit-like extension extending in the axial direction of the multi-disc clutch is provided in the radial inner chamber of the multi-disc clutch for distributing lubricant. In particular, an extension is assigned to at least one of the reset elements, with the extension at least partially surrounding the reset element in the circumferential direction. It is also possible for such an extension to be assigned to each of the reset elements. The extension may have at least one opening on its circumferential surface through which the lubricant is able to escape in the radial direction. In other words, the lubrication of the multi-disc clutch is ensured in a simple fashion by the distributor insert. The conduit-like extensions—regardless of their cross section—are provided for this purpose. Lubricant may be supplied and distributed through these extensions in the axial direction.

It has been proven advantageous for the distributor insert to form a lubricant chamber that is connected to the at least one extension and is disposed at an offset in the axial direction relative to the discs. In this embodiment, the lubricant chamber is disposed on one of the two sides of the disc stack, i.e., it is not disposed in the radial direction between an input shaft and the disc stack of the clutch, for example. The lubricant chamber particularly serves as an intermediate reservoir that is supplied with lubricant from outside the clutch and that "relays" the lubricant to the at least one extension. The lubricant chamber may be formed completely or partially by the distributor insert. "Partially" means that the distributor insert is combined with one or more other components of the multi-disc clutch to form the lubricant chamber.

The distributor insert may include an annular plate that extends essentially in a plane that is perpendicular to the rotational axis and that is connected to the extension, in particular, that is designed as one piece with the extension. The annular plate may have an edge section extending in the axial direction on its outer circumference in order to form a lubricant chamber with a component of the multi-disc clutch. For example, one component of the clutch forms one or more side walls of the lubricant chamber. The other side walls are then formed by the annular plate and the edge section.

The lubricant chamber is preferably connected to a lubricant conduit through which lubricant may be supplied to the lubricant chamber, with the lubricant conduit having an oil supply device. In particular, the oil supply device is an annular element that is rotationally mounted and conically formed in the axial direction, for example, a frustoconical ring (truncated cone) that forms a centrifugal disc. "Supply" is also to be understood as supporting the distribution of lubricant.

According to another embodiment of the multi-disc clutch, a retaining device is provided for the purpose of securing the reset elements in the radial direction of the multi-disc clutch, with the retaining device having two fastening devices for each reset element that are formed on different components of the clutch that are disposed in a rotationally secure fashion relative to one another (for example, on a pressure plate and a counterpressure plate), with the components being disposed on axially opposite ends of the disc stack formed by the first and second discs. This embodiment of the retaining device may be realized in a particularly simple fashion and nevertheless allows a reliable fastening of the reset elements.

Recesses or pins may be considered as suitable fastening devices. These fastening devices may also be used in any desired combination in order to create a reliable retaining device.

For reasons of simplified installation, it is advantageous for the distributor insert and the retaining device to form one structural unit, which is designed in particular as one piece. The distributor insert and/or the retaining device may be essentially made of plastic, whereby the production costs for the multi-disc clutch are reduced.

An additional simplification of the embodiments of the multi-disc clutch according to the invention having a distributor insert and/or a retaining device is achieved if the distribution insert and/or the retaining device are attached in a rotationally secure fashion to a component that is movable in the axial direction for the purpose of activating the clutch. Such a component that is movable in the axial direction is, for example, the pressure plate, which has been discussed multiple times. This fastening may occur by snapping into place, for example.

Advantageous reset elements have elastic properties. Coil springs, in particular embodied as compression springs, are suitable for this purpose.

The invention further relates to a transfer case having a multi-disc clutch according to one of the embodiments described above. As has already been discussed above, a transfer case should particularly be understood to mean a transmission having one input shaft and two output shafts (with a through drive or a differential).

Additional embodiments of the invention are provided in the description, the drawings, and the claims.

DRAWINGS

The present invention will be described below purely by way of example with reference to advantageous embodiments. Shown are:

Figure 3:
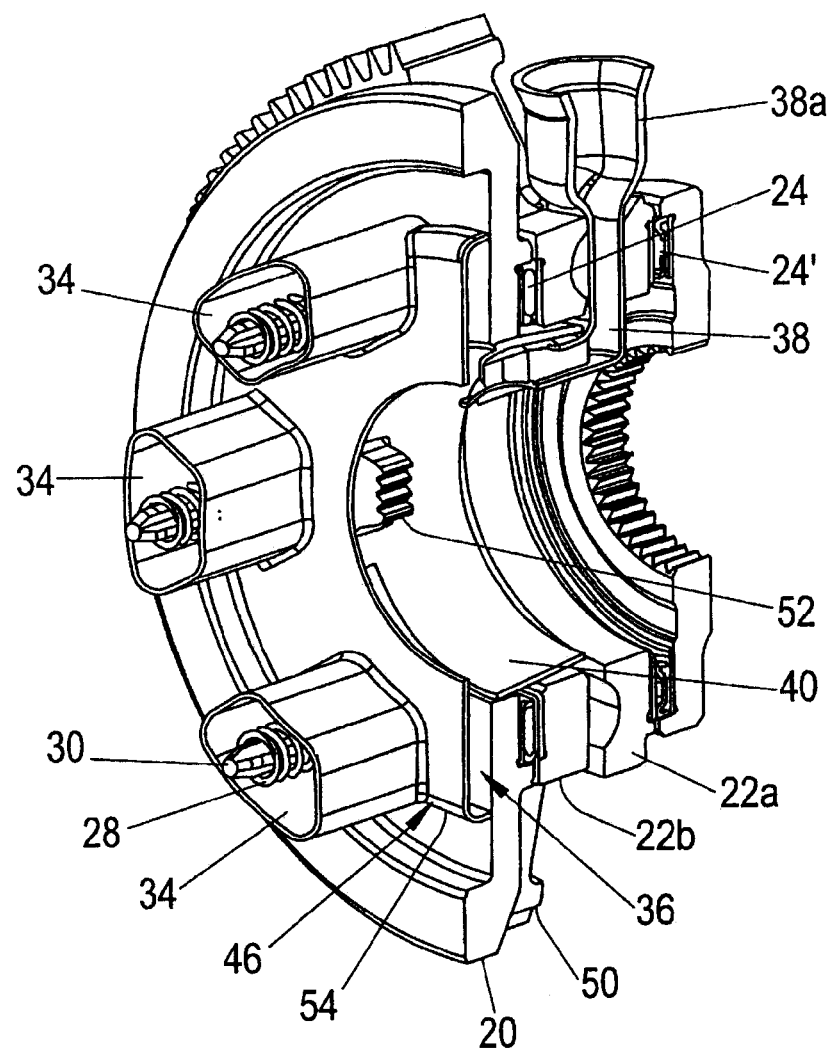
FIG. 3 is a perspective view of the embodiment according to FIG. 2.
Figure 4:
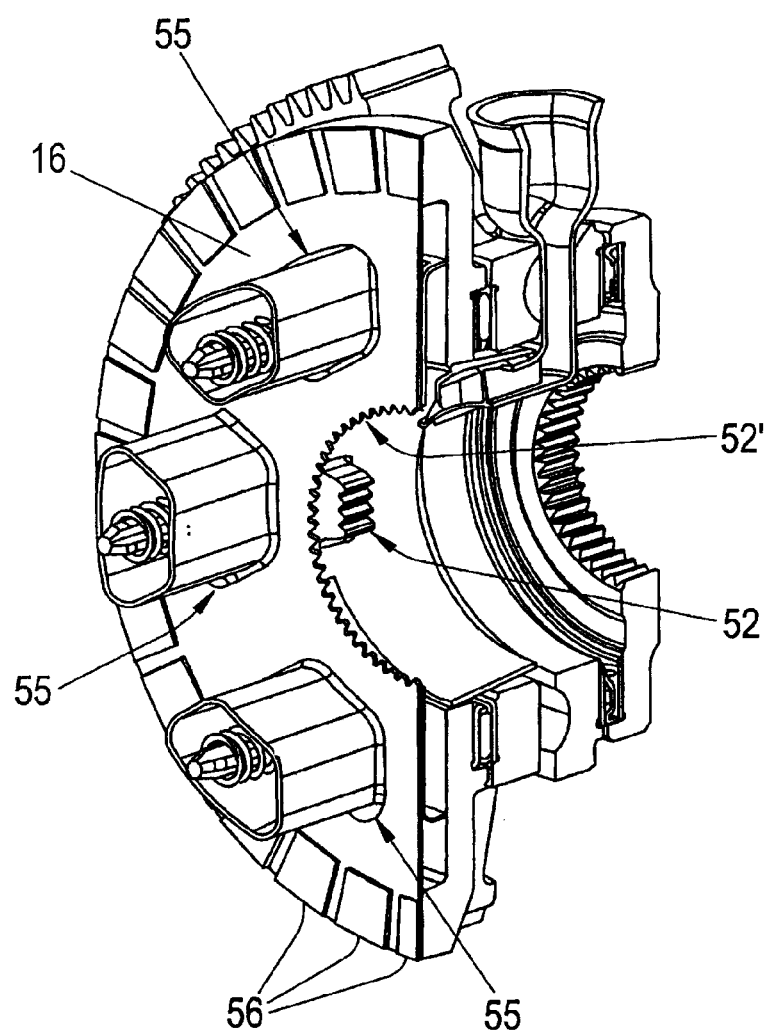
Figure 6A:
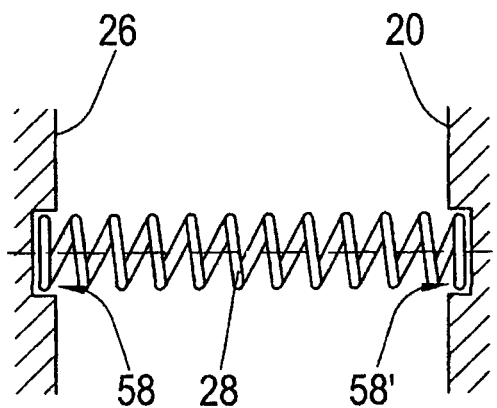
Figure 6B:
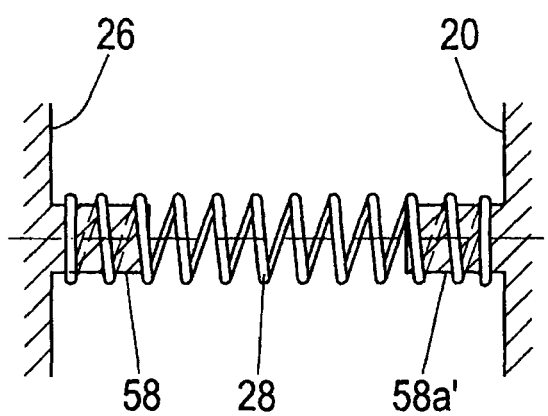

FIG. 4 the view according to FIG. 3 with an inner disc;

FIG. 5A is a schematic cross section of another embodiment of the multi-disc clutch according to the invention;

FIG. 5B is an enlarged section of FIG. 5A;

FIGS. 6A and 6B are various embodiments of a retaining device; and

FIGS. 7A and 7B are exploded views of another embodiment of a multi-disc clutch according to the invention.

DETAILED DESCRIPTION

Figure 1:
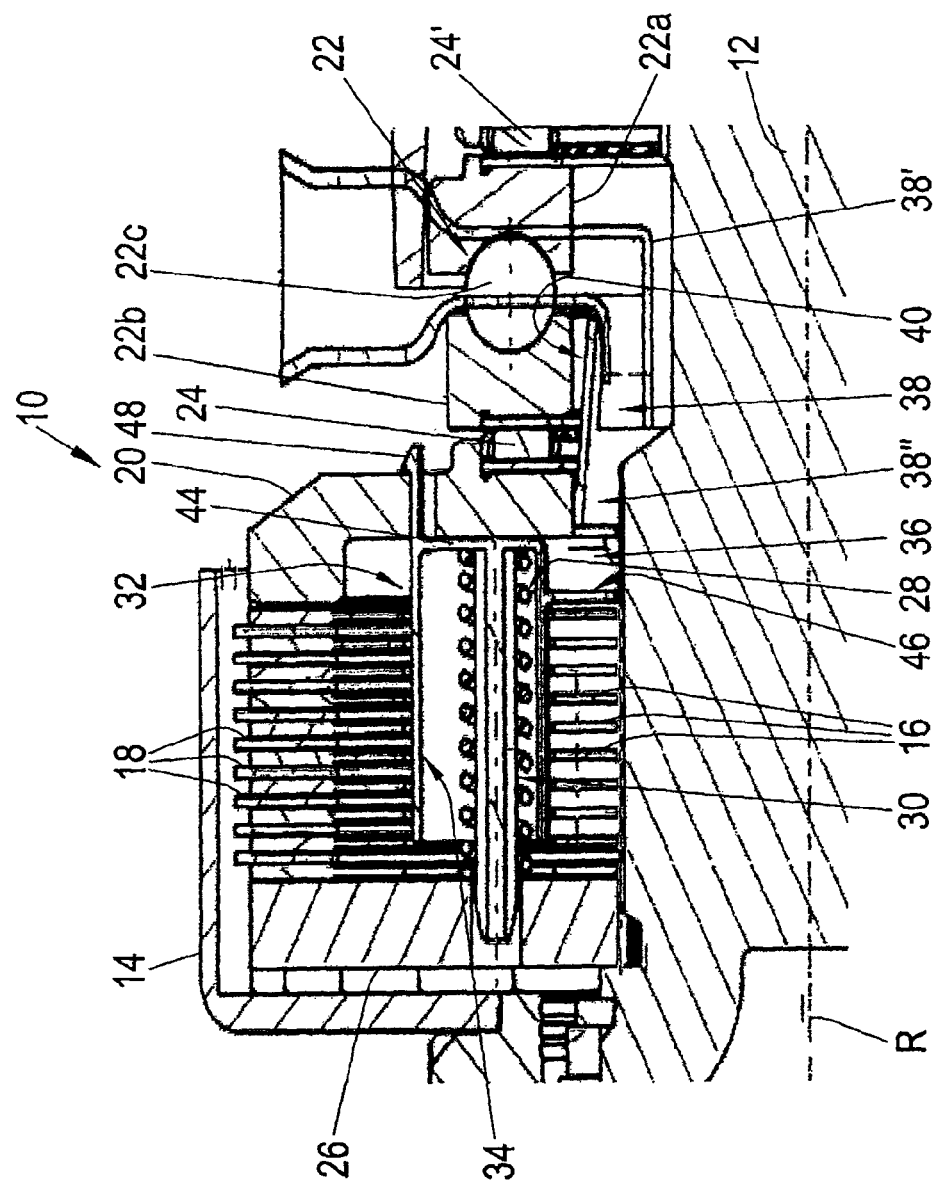
FIG. 1 is a schematic cross section of an embodiment of the multi-disc clutch according to the invention.

FIG. 1 schematically shows a cross section of a multi-disc clutch 10. The multi-disc clutch 10 is used to transfer torque between a shaft 12 that is driven to a rotational motion around a rotational axis R and a clutch cage 14 that is rotationally mounted relative to the shaft 12 and that is connected in a driven fashion to additional elements of a transfer case (not shown). The multi-disc clutch 10 has inner discs 16 that are connected in a rotationally secure fashion to the shaft 12 by a gearing. The inner discs 16 are displaceable in the axial direction, i.e., parallel to the rotational axis R. Analogously, the outer discs 18 are associated with the clutch cage 14.

In order to transfer torque from the shaft 12 to the clutch cage 14—in certain applications, the transfer of torque may occur in the reverse direction as well—a partial or complete connection must be produced between the inner discs 16 and the outer discs 18. This occurs by an axial displacement of the discs 16, 18 in order to bring them into frictional engagement with one another. The strength of this connection depends on the axial force exerted for the axial displacement. The discs 16, 18 may be provided with friction elements in order to improve the frictional engagement.

The axial force described above for activating the clutch is provided by a pressure piston 20. The pressure piston 20 may be displaced in the axial direction. A displacement of the pressure piston 20 is achieved using a ball ramp unit 22 that is connected to the pressure piston 20 via an axial bearing 24. If the ramp rings 22a, 22b of the ball ramp unit 22 are twisted opposite one another, then they move apart due to the inclined ramps formed in said ramp rings in conjunction with the balls 22c disposed between the ramp rings 22a, 22b. Because the ramp ring 22a is supported in the axial direction on an axial bearing 24', this results in a movement of the ramp ring 22b to the left, whereby the pressure piston 20 compresses the disc stack formed by the inner discs 16 and the outer discs 18. The disc stack is supported in the axial direction on a counterpressure plate 26, which is connected to the shaft 12 in a rotationally and axially fixed fashion.

When the activation of the clutch is removed, i.e., the clutch is released, the pressure piston 20 may be moved to the right again. However, this occurs only if a corresponding reset force is provided. This reset force causes the clutch to open, i.e., the discs 16, 18 are able to separate again, whereby the frictional engagement is removed ("ventilation of the clutch").

The reset force is provided by a reset device. FIG. 1 shows a spring 28 that, as a reset element, is a part of the reset device. The spring 28 acts between the pressure piston 20 and the counterpressure plate 26. Upon activation of the clutch 10, the spring 28 is compressed. The force thus applied is converted back into a movement of the pressure piston 20 to the right upon the activation of the clutch being terminated. In contrast to the known reset device concepts, the spring 28 is disposed in an eccentric fashion, i.e., is not coaxial to the shaft 12. Therefore, it does not act on the pressure plate 20 in a region in the vicinity of the shaft; rather, it acts in a central area—viewed in the radial direction—which has an advantageous effect on the reset or ventilation process.

In order to secure the spring 28 in its position, a pin 30 is provided that extends through the spring 28. Thus, the spring 28 may be radially supported on the pin 30 if centrifugal forces are acting on the spring 28 during operation of the clutch 10. The pin 30 is formed on a distributor insert 32 that simultaneously ensures the supply of lubricant oil to the multi-disc clutch 10 and the distribution of lubricant in its interior. A conduit 34 located radially to the outside is associated with the pin 30 and the spring 28, through which the lubricant may be supplied in the axial direction through the disc stack. The interior of the conduit 34 is connected to a lubricant chamber 36 located radially to the inside that is supplied with lubricant via a lubricant conduit 38. The lubricant conduit 38 has a lubricant conduit section 381 that is disposed in a rotationally secure fashion relative to a multi-disc clutch housing (not shown). The lubricant escaping from the conduit section 38' is transferred to a lubricant conduit section 38" that is in contact with the rotating elements of the multi-disc clutch 10. In the embodiment shown in FIG. 1, these rotating components are the shaft 12 on one side and a centrifugal disc 40 on the other side, which is a conically shaped ring or conically shaped pipe section that opens in the direction of the disc stack.

The lubricant is carried along by the rotation of the shaft 12 and the centrifugal disc 40 and conveyed to the lubricant chamber 36. The centrifugal force caused by the rotation pushes the lubricant radially outwards, and therefore also into the conduit 34, where it is further conveyed in the axial direction. The lubricant is distributed between the discs 16,18 through openings (not shown) in the radially outer wall of the axial conduit 34. In principle, corresponding openings may also be provided on the radially inner wall of the conduit 34.

FIG. 1 shows that the conduit 34 does not extend completely through the disc stack in the region of the counterpressure plate 26. The gap between the conduit 34 and the counterpressure plate 26 is closed; however, when the pressure piston 20 also presses the distributor insert 32 to the left upon activation of the clutch 10. In order to allow an axial motion of the distributor insert 32 relative to the counterpressure plate 26, the pin 30 is also mounted on the counterpressure plate 26 in an axially movable fashion. For this purpose, a bore 42 is provided in the counterpressure plate 26. On the side of the pressure piston, the spring 28 is supported on the pressure piston 20 in an axially secure fashion via a base section 44 of the distributor insert 32.

In order to divide the lubricant chamber 36 from the disc stack in a region near the shaft, the distributor insert 32 has an annular plate 46.

FIG. 1 shows only a single spring 28 with a conduit 34 surrounding it. In practice, however, the multi-disc clutch 10 has two or more resetting springs 28 and conduits 34, which are evenly distributed in the circumferential direction. Here, provision may be made for a conduit 34 to be allocated to each spring 28. In certain applications, however, it is advantageous for not every spring 28 to have a conduit 34 allocated to it, but rather, for example, only every other spring. Conversely, it is also conceivable for more conduits 34 to be provided than springs 28.

The distributor insert 32 may be produced in a cost-effective manner as a one-piece component made of plastic that ensures a distribution of lubricant in the interior of the clutch 10 as well as carrying the components of the reset device in the form of the springs 28. In order to simplify installation, the distributor insert may be fastened to the pressure plate 20 with the aid of locking levers 48.

Figure 2:
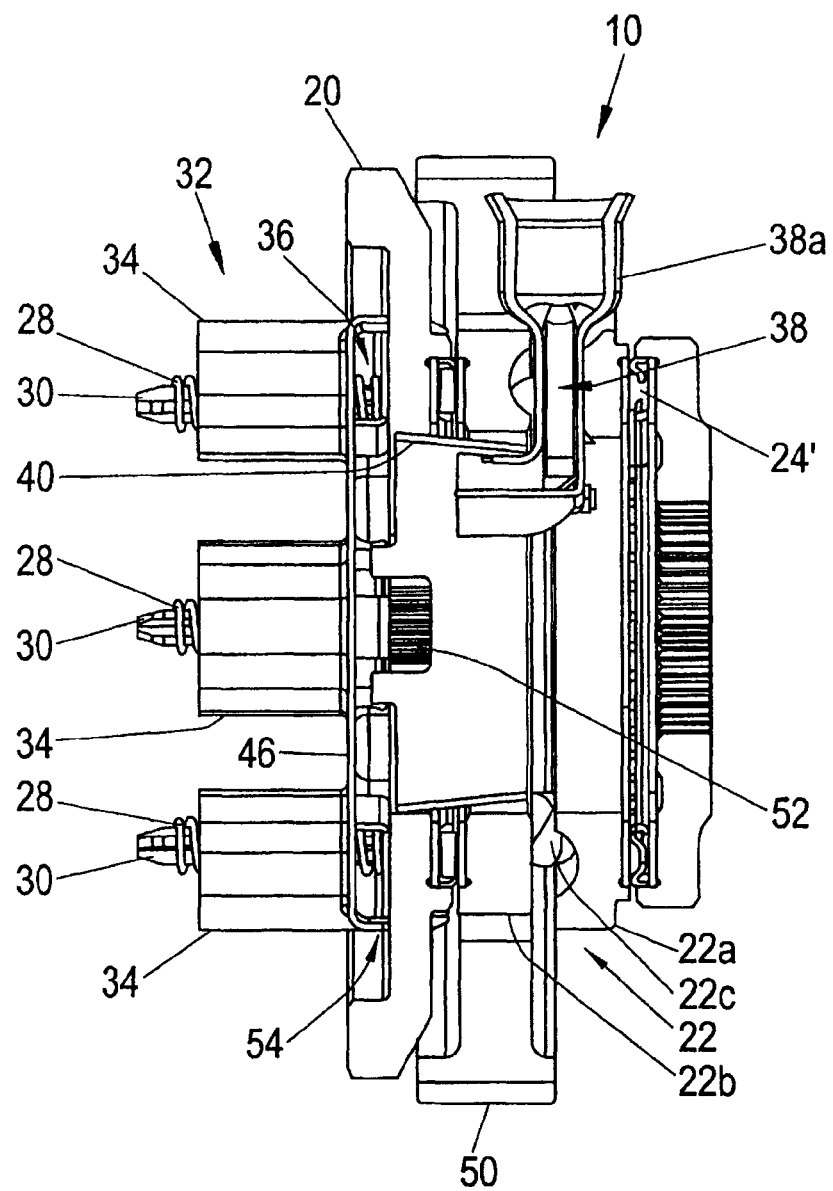
FIG. 2 is a cross section of an additional embodiment of the multi-disc clutch according to the invention.

FIG. 2 shows another embodiment of the multi-disc clutch 10; for the sake of clarity, the shaft 12, the disc stack, and the clutch cage 14 are not shown here. Components with the same function as in the embodiment described above are designated with the same reference characters.

Among other things, the figure shows the lubricant conduit section 38', which is fixed to the housing, having a connector piece 38a for connection to a lubricant supply and the centrifugal disc 40, which form the lubricant conduit 38 along with the shaft 12, which is not shown. Components of the ball ramp unit 22, which is responsible for an axial movement of the pressure piston 20, may also be seen. The ramp ring 22b has a gear wheel 50. Using the gear wheel 50, the ramp ring 22b may be twisted relative to the ramp ring 22a, thus activating the clutch 10.

In addition, the structure of the distributor insert 32, which is locked onto the pressure piston 20, may be seen. The embodiment shown has six conduits 34, which are evenly distributed in the circumferential direction and of which only three may be seen in the view shown in a sectional plane along the rotational axis R of the multi-disc clutch 10. The conduits 34 surround the springs 28 allocated to them, which are disposed on pins 30. The distributor insert 32 is connected in a rotationally secure manner to the pressure piston 20, which in turn is connected in a rotationally secure manner to the shaft 12 (not shown) via a gearing 52.

FIG. 2 also clarifies the structure of the lubricant chamber 36, which is connected to each of the conduits 34 and is limited in the axial direction by the annular plate 46. The axially opposite wall of the lubricant chamber 36 is formed by the pressure piston 20. The lubricant is prevented from escaping from the lubricant chamber 36 in the radial direction by a side wall section 54 formed on the distributor insert 32.

FIG. 3 shows a perspective view of the embodiment according to FIG. 2 for the purpose of clarifying the spatial arrangement of the components described here.

FIG. 4 is based on the view of FIG. 3, however, an inner disc 16 has been added in order to describe the structure and functionality of the inner disc 16. The inner disc 16 is connected in a rotationally secure manner to the shaft 12, which is not shown, by a gearing 52'. In contrast, an axial displacement of the inner disc 16 is possible, as was already described at the outset. The inner disc 16 has recesses 55 that are circumferentially closed and through which the conduits 34 of the distributor insert 32 extend. The springs 28 thus penetrate the inner disc 16 (and the other inner discs, which are not shown here). Moreover, the inner disc 16 is provided in a radially outer region with frictional coverings 56 that cooperate with the corresponding frictional coverings of an adjacent outer disc 18, which is not shown, upon activation of the multi-disc clutch 10. The region provided with the frictional coverings 56 approximately corresponds to the region that is subjected to an axial force upon activation of the multi-disc clutch 10 by the pressure piston 20. The outer discs 18 do not extend substantially farther inward in the radial direction than the region of the inner discs 16 defined by the frictional coatings 56. On the one hand, a connection of the discs 16, 18 is desired that is located as far to the outside as possible in order to be able to transfer large amounts of torque and, on the other hand, the outer discs 18 cannot extend substantially farther inward because otherwise the conduits 34 would block a rotation between the discs 16,18.

In the embodiment shown, the conduits 34 do not have any openings on their outsides. However, such openings may be provided in order to provide the clutch 10 with lubricant in various axial sections of the disc stack.

Another embodiment of the multi-disc clutch 10 is shown in FIG. 5A. Components with a corresponding function to those in the embodiment described above have been designated with the same reference characters.

The essential difference between the two embodiments lies in the fact that the springs 28 of the embodiment according to FIG. 5A are not mounted on an axial pin 30. In order to secure the springs 28, recesses 58 and 58' are provided on the counter-pressure plate 26 and the pressure piston 20, into which the respective ends of the springs 28 are inserted. With its simple construction, this embodiment does not require any additional structural components to take into account the relative axial motion of the counterpressure plate 26 and the pressure piston 20.

FIG. 5B shows an enlarged section of FIG. 5A in order to clarify the structure of the recesses 58, 58' and the spring 28 disposed therein. Moreover, the dashed arrows show the course of a lubricant SF through the distributor insert 32 into the disc stack. The conduit 34 shown in FIG. 5B has radial openings 60 for the purpose of distributing the lubricant to different axial regions of the disc stack. The lubricant flow SF through the lubricant conduit 38 into the lubricant chamber 36 is shown in FIG. 5A.

FIG. 6A clarifies again schematically how the recesses 58, 58' are disposed for securing the spring 28. FIG. 6B shows an alternative embodiment in which, instead of the recesses 58, 58', pins 58a, 58a* are provided for the purpose of holding the spring 28 in its position. It is to be understood that combinations of the two variants shown are also possible. In one combination, for example, the spring 28 may be disposed on one side in the recess 58 or 58' while the spring is secured on the other side by the pin 58a or 58a'. The spring is secured in a particularly reliable fashion if recesses 58, 58' as well as pins 58a, 58a' are provided, i.e., if the pin 58a or 58a' is additionally provided in the central region of the recess 58 or 58', in order to secure the spring 28 from "inside" and from "outside" against changes in position.

FIGS. 7A and 7B show an exploded view of an embodiment that, like the embodiment according to FIGS. 5A and 5B, does not have any axial pins 30 for securing the springs 28. The one-piece construction of the distributor insert 32 as well as the recesses 58, 58' on the counterpressure plate 26 and the pressure piston 20 may be clearly seen. Moreover, locking levers 48' are shown on the centrifugal disc 40, which contribute to a rotationally secure attachment of the centrifugal disc 40 to the pressure plate 20. A relative twisting of the centrifugal disc 40 and the pressure plate 20 is also prevented by recesses 62 on the centrifugal disc 40 that cooperate with gear segments 52 on the pressure plate 20.

LIST OF REFERENCE NUMBERS

10 Multi-disc clutch
12 Shaft
14 Clutch cage
16 Inner disc
18 Outer disc
20 Pressure piston
22 Ball ramp unit
22a, 22b Ramp ring
22c Ball
24, 24' Axial bearing
26 Counterpressure plate
28 Spring
30 Pin
32 Distributor insert
34 Conduit
36 Lubricant chamber
38 Lubricant conduit
38' Lubricant conduit section, fixed
38" Lubricant conduit section, rotating
38a Connector piece
40 Centrifugal disc
42 Bore
44 Base section 46 Annular plate
48, 48' Locking lever
50 Gear wheel
52, 52' Gearing
54 Side wall section
55 Recess
56 Fictional covering
58, 58', 58a, 58a' Recess
60 Opening
62 Centrifugal plate recess
R Rotational axis
SF Lubricant flow

What is claimed is:

1. A multi-disc clutch for transmitting torque between a first rotary part and a second rotary part, the multi-disc clutch comprising:
   a counterpressure plate rotationally and axially fixedly connected to the first rotary part;
   a disc stack disposed adjacent to the counterpressure plate and including a set of first discs alternatively interleaved with a set of second discs, the first discs being connected for rotation with the first rotary part and axial displacement relative thereto, the second discs being connected for rotation with the second rotary part and axial movement relative thereto, the first discs each having at least two conduit apertures;
   a pressure piston connected for rotation with the first rotary part and being axially moveable relative to the disc pack and the counterpressure plate between a released position and an engaged position, the pressure piston being operable in its released position to release fictional engagement of the disc stack for establishing a non-torque transferring mode and being operable in its engaged position to frictionally engage the disc stack for establishing a torque transferring mode;
   a distributor insert fixed for rotation with the pressure piston, the distributor insert being configured to at least partially define a lubricant chamber and including at least two axially-extending tubular conduit extensions that are in fluid communication with the lubricant chamber, each of the at least two tubular conduit extensions arranged to extend through a corresponding one of the at least two conduit apertures in the first discs;
   a reset device including at least two reset elements each disposed within a corresponding one of the at least two tubular conduit extensions, each of the reset elements arranged to act between the counterpressure plate and the pressure piston for normally biasing the pressure piston toward its released position;
   an actuator operable for forcibly moving the pressure piston from its released position into its engaged position in opposition to the biasing exerted on the pressure plate by the reset elements; and
   a lubricant conduit configured to supply a lubricant to the lubricant chamber of the distributor insert.

2. The multi-disc clutch of claim 1 further including a tubular member fixed for rotation with the pressure piston and defining a lubricant channel with the first rotary part that is arranged to transmit the lubricant from the lubricant conduit to the lubricant chamber in the distributor insert.

3. The multi-disc clutch of claim 1 wherein the tubular conduit extensions in the distributor insert include apertures configured to permit the lubricant supplied to the conduit extensions from the lubricant conduit to be discharged into the disc stack for cooling and lubricating the interleaved first and second discs.

4. The multi-disc clutch of claim 1 wherein the distributor insert further includes axially-extending pins extending from a base section of the tubular conduit extensions, and wherein the reset elements are coil springs arranged within the tubular conduit extension to surround the pins.

5. The multi-disc clutch of claim 4 wherein the counterpressure plate includes at least two bores that are adapted to receive a distal end of a corresponding pin upon movement of the distributor insert with the pressure piston between its released and engaged positions.

6. The multi-disc clutch of claim 1 wherein each one of the at least two reset elements disposed in the at least two tubular conduit extensions of the distributor insert has a first segment retained in a recess formed in the pressure piston and a second segment retained in a recess formed in the counterpressure plate.

7. The multi-disc clutch of claim 1 wherein each one of the at least two reset elements disposed in the at least two tubular extensions of the distributor insert is a coil spring having a first end engaging the pressure piston and a second end engaging the counterpressure plate.

8. The multi-disc clutch of claim 1 wherein each reset element is a spring having a first end supported in a recess formed in the pressure piston and a second end supported in a recess formed in the counterpressure plate.

9. The multi-disc clutch of claim 1 wherein the lubricant chamber is delineated between the pressure piston, an annular plate segment of the distributor insert, and a side wall segment of the distributor insert connected to the annular plate segment and extending toward the pressure piston, and wherein the annular plate segment surrounds the first rotary part and the side wall segment axially offsets the lubricant chamber relative to the first disc stack.

10. The multi-disc clutch of claim 1 wherein the first rotary part is a shaft defining a rotary axis, wherein the second rotary part is a clutch drum coaxially surrounding the shaft, wherein the counterpressure plate includes internal splines that are meshed with external splines on the shaft, wherein the first discs are inner discs having internal splines meshed with the external splines on the shaft, wherein the pressure piston has a central aperture with internal spline segments meshed with the external splines on the shaft, and wherein the second discs are outer discs having an outer diameter surface splined to the clutch drum and an inner diameter surface surrounding the tubular conduit extensions extending axially from the distributor insert.

11. The multi-disc clutch of claim 10 wherein the distributor insert includes axially-extending locking levers configured to extend through the central aperture in the pressure piston and engage the pressure piston between its internal spline segments for fixing the distributor insert for common rotation and axial movement with the pressure piston.

12. The multi-disc clutch of claim 10 further including a conical member surrounding the shaft for defining a lubricant channel providing fluid communication between the lubricant conduit and the lubricant chamber in the distributor insert, and wherein the conical member if fixed for common rotation and axial movement with the pressure piston.

13. The multi-disc clutch of claim 1 wherein the first rotary part includes a shaft and a coupling sleeve fixed for rotation with the shaft, and wherein the first discs are rotationally fixedly and axially moveably connected to the coupling sleeve.

14. The multi-disc clutch of claim 1 further including a retaining device operable for securing the reset elements, the retaining device including two fastening elements for each of the reset elements, wherein one of the two fastening elements is formed on the counterpressure plate and the other one of the two fastening elements is formed on one of the pressure piston and the distributor insert.

15. The multi-disc clutch of claim 14 wherein the fastening elements comprise components selected from a group including recesses and posts.

16. The multi-disc clutch of claim 1 wherein the first discs are inner discs having an inner diameter surface connected to the first rotary part, wherein the second discs are outer discs having an outer diameter surface connected to the second rotary part, wherein the conduit apertures in each of the inner discs is formed radially outward of the inner diameter surface, and wherein the outer discs surround the tubular conduit extensions so as to permit the inner discs to rotate relative to the outer discs.

17. The multi-disc clutch of claim 1 wherein the number of tubular conduit extensions extending from the distributor insert is equal to the number of reset elements such that one of the reset elements is disposed in each one of the tubular conduit extensions.

18. The multi-disc clutch of claim 1 wherein the tubular conduit extensions of the distributor insert are circumferentially aligned relative to a rotary axis of the first rotary part.

19. The multi-disc clutch of claim 18 wherein the tubular conduit extensions of the distributor insert are arranged to lie on a common circle having a center point coincident with the rotary axis.

20. The multi-disc clutch of claim 18 wherein the tubular conduit extensions of the distributor insert are evenly distributed in a circumferential direction.

21. A multi-disc clutch for transmitting torque between a rotary shaft and a rotary clutch part, the multi-disc clutch comprising:
a clutch pack having a plurality of inner friction discs alternatively interleaved with a plurality of outer frictions discs, the inner discs being splined for rotation with and axial movement on the shaft and the outer discs being splined for rotation with and axial sliding movement on the clutch part, the inner discs having at least two conduit apertures;
a counterpressure plate rotationally and axially fixedly connected to the shaft adjacent a first end of the clutch pack, the counterpressure plate having first fastening elements aligned with each of the at least two conduit apertures it the inner discs;
a pressure piston fixed for rotation with the shaft and axial movement relative to a second end of the clutch pack between a first position and a second position, the pressure plate being operable in its first position to release frictional engagement of the clutch pack for establishing a non-torque transmitting mode and being operable in its second position to frictionally engage the clutch pack for establishing a torque transmitting mode, the pressure pistol having second fastening elements aligned with each of the at least two conduit apertures in the inner discs;
a distributor insert fixed for common rotation and axial movement with the pressure piston, the distributor insert being configured to at least partially define an annular lubricant chamber and at least two axially-extending tubular extensions that are in fluid communication with the lubricant chamber, the lubricant chamber being delineated by the pressure piston, an annular plate segment of the distributor insert, and a side wall segment of the distributor insert connected to the annular plate segment and extending toward the pressure piston, the lubricant chamber is adapted to receive lubricant from a remote source, each of the at least two tubular extensions being configured to pass through a corresponding one of the at least two conduit apertures in the inner discs;
a reset device including at least two reset elements each disposed within a corresponding one of the tubular extensions of the distributor insert, each of the reset elements operable to normally bias the pressure piston toward its first position, each reset element having a first portion engaging a corresponding one of the first fastening elements on the counterpressure plate and a second portion engaging a corresponding one of the second fastening elements on the pressure piston; and
an actuator operable for moving the pressure piston from its first position into its second position in opposition to the biasing of the reset elements.

22. The multi-disc clutch of claim 21 wherein the outer discs having an inner diameter surface configured to surround each of the at least two axially-extending tubular extensions of the distribution insert so as to permit relative rotation between the inner and outer discs when the pressure piston is in its first position, and wherein each of the at least two tubular extensions includes at least one aperture for supplying lubricant from within the extensions into the clutch pack.

23. The multi-disc clutch of claim 21 wherein the first fastening elements comprise recesses formed in the counterpressure plate, and wherein the second fastening elements comprise recesses formed in the pressure piston.

24. A multi-disc clutch, comprising:
an inner rotary part rotatable about a rotational axis;
an outer rotary part surrounding the inner rotary part for rotation relative thereto about the rotational axis;
a counterpressure plate rotationally and axially fixedly connected to the inner rotary part;
a disc stack disposed adjacent to the counterpressure plate and including an inner disc coupled for rotation with the inner rotary part and an outer disc coupled for rotation with the outer rotary part, the inner disc having first and second conduit apertures formed therethrough;
a pressure plate assembly including a pressure piston, a distributor insert rotationally and axially fixedly connected to the pressure piston, and a reset device, the pressure piston being axially moveable relative to the disc stack between a released position and an engaged position, the pressure piston being operable in its released position to disengage the disc stack and being operable in its engaged position to frictionally engage the disc stack, the distributor insert including a radially extending plate segment and an axially extending end wall segment at least partially defining an annular lubricant chamber, the distributor insert further including first and second axially-extending tubular conduits in fluid communication with the lubricant chamber and which pass through corresponding ones of the first and second conduit apertures in the inner disc, the first tubular conduit having a first lubricant opening and the second tubular conduit having a second lubricant opening, the reset device being operable to normally bias the pressure piston toward its released position, the reset device having a first reset element disposed within the first tubular conduit and a second reset element disposed within the second tubular conduit, wherein each of the first and second reset elements engages the counterpressure plate and one of the distributor insert and the pressure piston; and
an actuator for moving the pressure plate from its released position into its engaged position in opposition to the biasing of the first and second reset elements;

wherein a lubricant is supplied from a source of lubricant through the lubricant chamber into the first conduit and the second conduit and is discharged through the first and second lubricant openings for cooling the disc stack.

25. The multi-disc, clutch of claim 24 wherein the counterpressure plate includes a pair of first fastening elements, wherein the pressure piston includes a pair of second fastening elements, wherein the first reset element is a first spring having one end engaging one of the first fastening elements and another end engaging one of the second fastening elements, and wherein the second reset element is a second spring having one end engaging the other one of the first fastening elements and a second end engaging the other one of the second fastening elements.

26. The multi-disc clutch of claim 25 wherein the first fastening elements are first recesses formed in the counterpressure plate, wherein the second fastening elements are second recesses formed in the pressure piston, and wherein the ends of the first spring are disposed in an aligned first pair of the first and second recesses and the ends of the second spring are disposed in an aligned second pair of the first and second recesses.

* * * * *